US006698074B1

(12) United States Patent
Kang

(10) Patent No.: US 6,698,074 B1
(45) Date of Patent: Mar. 2, 2004

(54) PINCERS FOR ASSEMBLING AND DISASSEMBLING THE SPRINGS OF THE BRAKE SHOES IN A DRUM BRAKE

(76) Inventor: Hsin Fa Kang, P.O. Box 90, Tainan City (TW)

( * ) Notice: Subject to any disclaimer, the term of this patent is extended or adjusted under 35 U.S.C. 154(b) by 0 days.

(21) Appl. No.: 10/464,436

(22) Filed: Jun. 19, 2003

(51) Int. Cl.[7] .................................................. B23P 19/04

(52) U.S. Cl. ............................. 29/227; 29/225; 29/268; 81/421; 81/429.5

(58) Field of Search .......................... 29/227, 225, 268, 29/257, 270, 286.5, 426.6, 450; 81/421, 424.5

(56) References Cited

U.S. PATENT DOCUMENTS 6,574,845 B2 * 6/2003 Kang .......................... 29/227
6,581,262 B1 * 6/2003 Myers ......................... 29/268

* cited by examiner

*Primary Examiner*—Joseph J. Hail, III
*Assistant Examiner*—Daniel Shanley

(57) ABSTRACT

A pair of pincers for assembling and disassembling the springs of the brake shoes in a drum brake includes a position lever and a hook lever pivotally combined together. The position lever has a ball joint on top for fitting a position member. The hook lever has its upper end formed with a hook facing the position member. The position member has a sleeve fitting and turning around the ball joint, and ratchet teeth provided on top. The pincers has two handles one of which has a groove and a blocking member at the lower end. Thus, the ratchet teeth of the position member grab the outer wall of the brake shoes, and the hook of the hook lever hooks the end of the spring to disassemble the spring. The end of the handle hooks the end of the spring and is slightly pried to assemble the spring.

1 Claim, 4 Drawing Sheets

PINCERS FOR ASSEMBLING AND DISASSEMBLING THE SPRINGS OF THE BRAKE SHOES IN A DRUM BRAKE

BACKGROUND OF THE INVENTION

1. Field of the Invention

This invention relates to a pair of pincers for assembling and disassembling the springs of the brake shoes in a drum brake, particularly to one able to be handled with ease and less labor.

2. Description of the Prior Art

Conventionally, a brake drum of a brake device of an automobile is installed on the axle for rotating together, having two brake shoes 1 disposed oppositely in the interior, as shown in FIG. 1. The two brake shoes 1 are respectively provided with plural hook holes 10 for receiving two hook ends 20 of strong springs 2 so as to always urge inward the two brake shoes 1, and each brake shoe 1 is fixed on the outer side with a brake lining 11 made of a coarse material and able to endure abrasion. When the brake of an automobile is actuated, two brake shoes 1 force two brake linings 11 to move outward and press the inner sides of the brake drum and accordingly produce a great frictional force to control the wheels of an automobile to stop. But, these brake linings 11 will gradually be worn off after the brake is employed for long, and under this condition, the brake shoes 1 have to be replaced with new ones so as to maintain the proper function of the brake and ensure safety of driving.

For the present, the strong springs 2 tightly hooking the brake shoes 1 are forcefully disassembled by means of a pair of needle nose pliers. However, when a pair of needle nose pliers clamps the hook end 20 of the spring 2 to carry out assembling and disassembling, it is not kept stable by any fulcrum, therefore a user has to pull it with a very huge force, thus not only increasing difficulty in assembling and disassembling and wasting labor and time but also possibly resulting in damage to the tools or to the components of an automobile.

SUMMARY OF THE INVENTION

This invention has been devised to offer a pair of pincers for assembling and disassembling the spring of the brake shoes in a drum brake, able to be operated with quickness and less force.

The feature of the invention is a position lever and a hook lever pivotally combined oppositely. The position lever has its upper end formed with a ball joint fitted around with a position member. The hook lever has its upper end formed with a hook facing the position member of the position lever. The position member further has a sleeve receiving the ball joint therein, able to turn around but impossible to disengage from the ball joint. Besides, the position member has it upper side formed with ratchet teeth, and the position lever and the hook lever respectively have a handle disposed at a lower portion, with one of the two handles provided with a lengthwise groove and a blocking member at the lower end.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
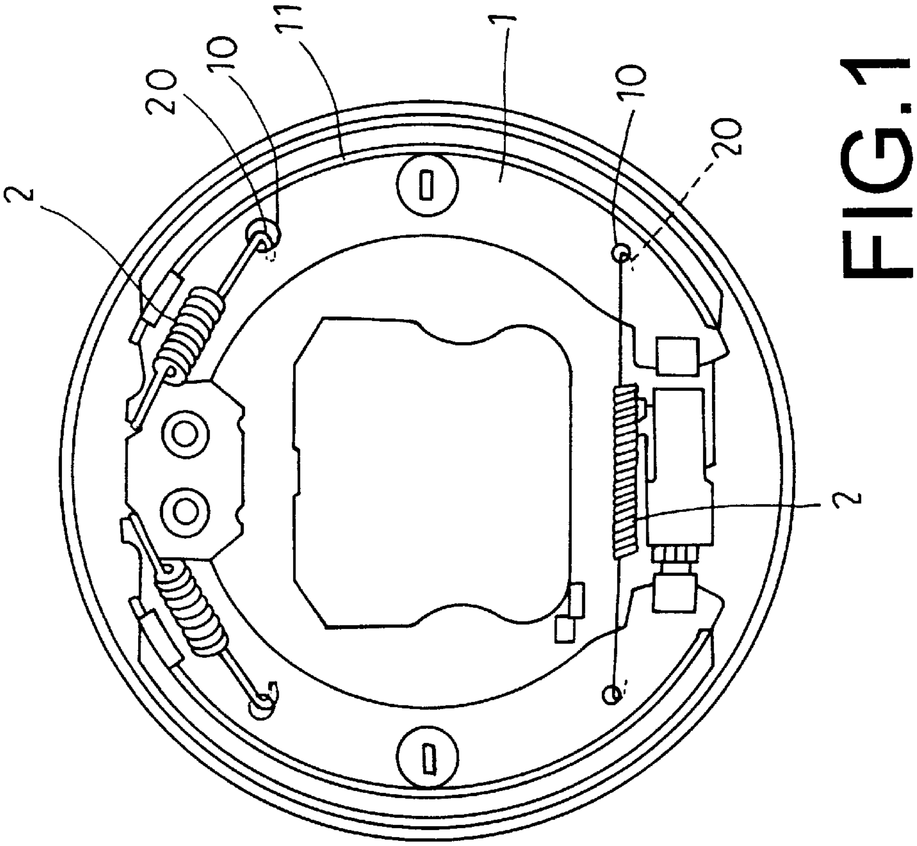
FIG. 1 is a cross-sectional view of a conventional drum brake device.
Figure 2:
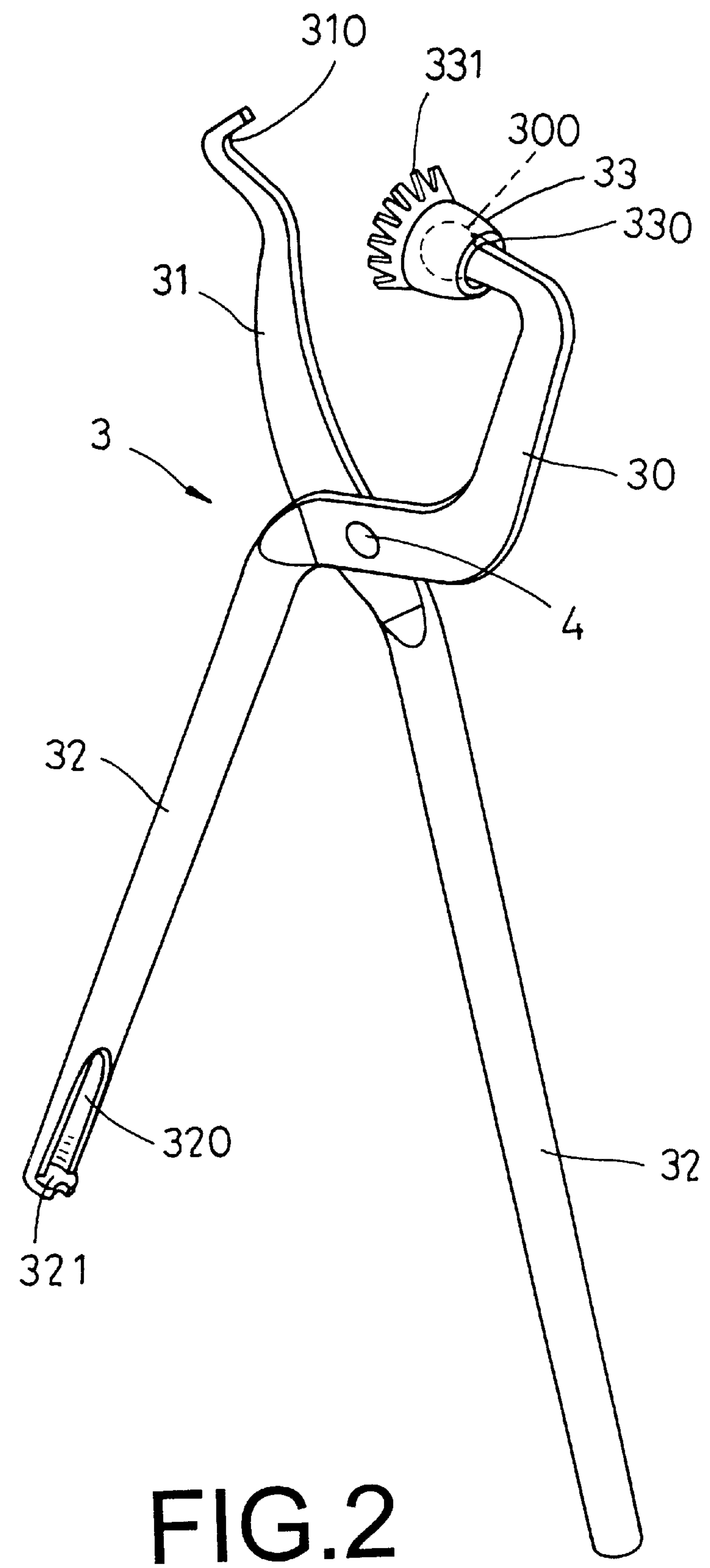
FIG. 2 is a perspective view of a pair of pincers in the present invention.

A preferred embodiment of a pair of pincers for assembling and disassembling the springs of the brake shoes in a drum brake of an automobile in the present invention, as shown in FIG. 2, includes a position lever 30 and a hook lever 31 respectively preset in its form as main components pivotally combined together.

The position lever 30 and the hook lever 31 are pivotally combined together by means of a rivet 4 and respectively have a handle 32 provided at the lower portion. The position lever 30 has its upper end formed with a ball joint 300 fitted around with a position member 33, which has a sleeve 330 receiving the ball joint 300 therein, enabling the position member 33 to turn around. Besides, the position member 33 has its topside provided with umbrella-shaped ratchet teeth 331. The hook lever 31 has its upper portion curved and formed on the upper end with a hook 310 facing the position member 33 of the position lever 30. Further, one of the two handles 32 is provided with a lengthwise groove 320 having a blocking member 321 positioned at the lower end.

Thus, the position member 33 has its sleeve 330 fitting around the ball joint 300, and the lower opening of the sleeve 330 is formed shrinking inward slightly so as to prevent the position member 33 from disengaging from the ball joint 300 and enable the position member 33 to be actuated to turn around by the ball joint 300, and further the outer end of the ratchet teeth 311 of the position lever 33 faces the hook 310 of the hook lever 31.

Figure 3:
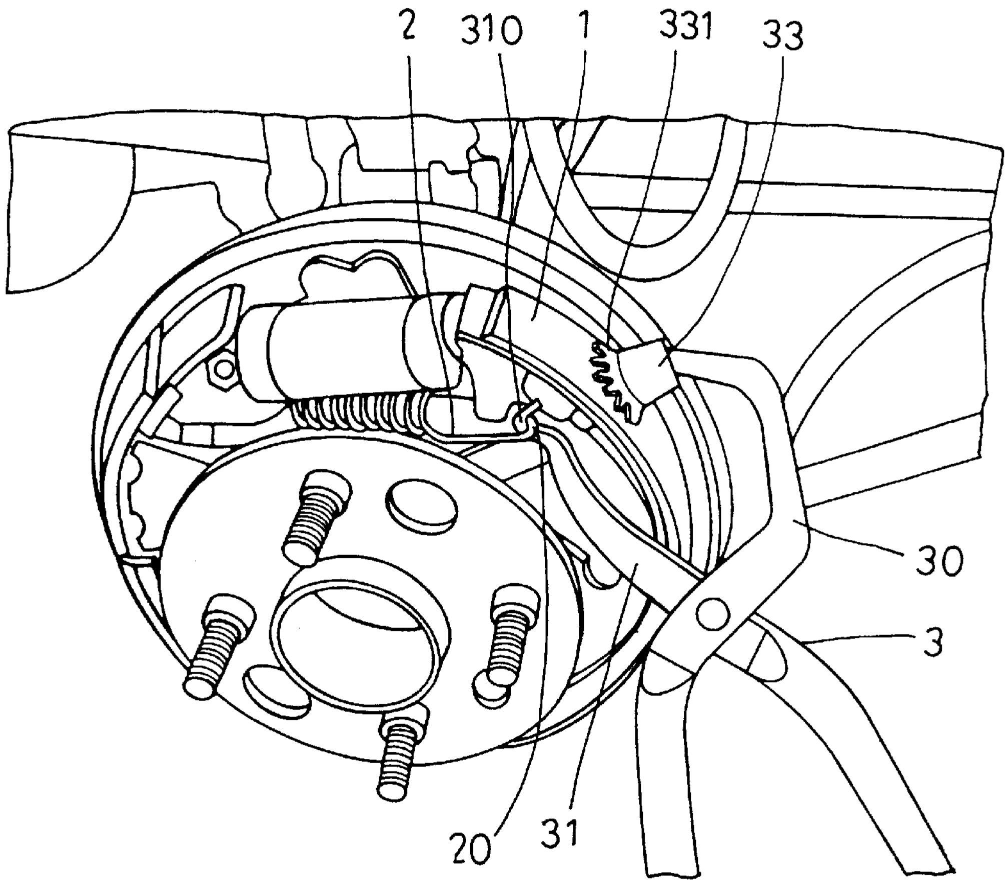
FIG. 3 is a perspective view of the pair of pincers in a condition of disassembling a spring from brake shoes in the present invention; and, FIG. 4 is a perspective view of the pair of pincers in a condition of assembling the spring on the brake shoes in the present invention.
Figure 4:
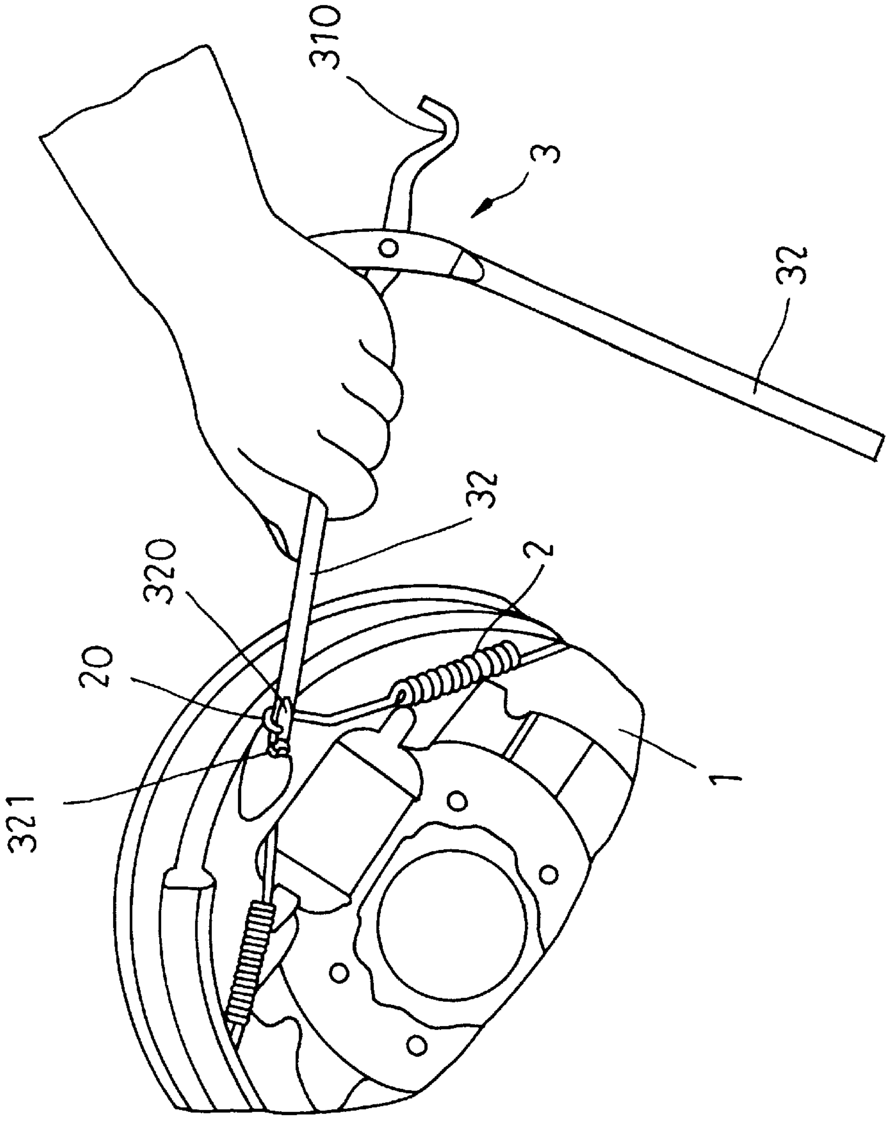

To disassemble the spring 2, referring to FIGS. 3 and 4, simply hold and push outward two handles 32 of the position lever 30 and the hook lever 31 to let the upper portions of the two levers 30, 31 separate outward. Next, the ratchet teeth 331 of the position member 33 are forced by the ball joint 300 to firmly grab the outer wall of the brake shoes 1, and the hook 310 of the hook lever 31 hooks the hook end 20 of the spring 2. Lastly, hold close the two handles 32 to let the ratchet teeth 331 of the position lever 33 tightly grab the brake linings 11 to form a force-applying fulcrum and then have the hook 310 of the hook lever 31 removing the hook end 20 of the spring 2 out of the hook hole 10 of the brake shoes 1, thus disassembling the spring 2 with quickness and with less force.

To assemble the spring 2, referring to FIG. 4, firstly, one hook end 20 of the spring 2 is made to hook the brake shoes 1 and the other hook end 20 of the spring 2 is hooked by the groove 320 and the blocking member 321 at the lower end of the handle 32. Next, pull forward the handle 32 together with the spring 2 to let the other hook end 20 of the spring 2 aligned with the hook hole 10 of the brake shoes 1 and then slightly pry the handle 32 to let the hook end 20 of the spring 2 move into the hook hole 10 of the brake shoes 1 along the groove 320 and the blocking member 321 of the handle 32.

As can be noted from the above description, this invention has the following advantages.

1. It is able to be operated with ease and with less force and elevate work efficiency.

2. It is convenient to assemble and disassemble the spring of the brake shoes with quickness and security, impossible to cause any damage to the components of an automobile.

While the preferred embodiment of the invention has been described above, it will be recognized and understood that various modifications may be made therein and the appended claims are intended to cover all such modifications that may fall within the spirit and scope of the invention.

What is claimed is:

1. A pair of pincers for assembling and disassembling the springs of the brake shoes in a drum brake, said pair of pincers comprising a position lever and a hook lever, said position level and said hook level pivotally combined together, said position lever having its upper end formed with a ball joint, said ball joint fitted around with a position member, said hook lever having its upper end formed with a hook, said hook facing said position member of said position level, said position member having a sleeve receiving said ball joint therein, said position member able to turn around and impossible to disengage from said ball joint, said position member provided with ratchet teeth on the upper side, said position lever and said hook lever respectively having their lower portions formed as a handle, one of said two handles provided with a lengthwise groove and a blocking member at the lower end;

said ratchet teeth of said position member firmly grabbing the outer wall of brake shoes, said hook of said hook member hooking the hook end of a spring, prying said hook lever able to quickly disassemble said spring from said brake shoes; and, said groove and said blocking member at the end of said handle hooking the hook end of a spring, said hook end of said spring pulled forward to face the hook hole of said brake shoe, said handle prying slightly to move said hook end of said spring into said hook hole of said brake shoe along said groove and blocking member of said handle so as to assemble said spring on said brake shoe easily and quickly.

* * * * *